(12) United States Patent
Ku et al.

(10) Patent No.: US 10,083,151 B2
(45) Date of Patent: Sep. 25, 2018

(54) INTERACTIVE MOBILE VIDEO VIEWING EXPERIENCE

(71) Applicant: OATH INC., New York, NY (US)

(72) Inventors: Hans T. Ku, La Canada Flintridge, CA (US); David M. Koenig, Los Angeles, CA (US); Edwin R. Leonard, Glendora, CA (US); Gene Z. Ragan, Los Angeles, CA (US)

(73) Assignee: OATH INC., New York, NY (US)

( * ) Notice: Subject to any disclaimer, the term of this patent is extended or adjusted under 35 U.S.C. 154(b) by 438 days.

(21) Appl. No.: 13/868,005

(22) Filed: Apr. 22, 2013

(65) Prior Publication Data

US 2013/0311886 A1 Nov. 21, 2013

Related U.S. Application Data

(60) Provisional application No. 61/649,916, filed on May 21, 2012.

(51) Int. Cl.

| G06F 3/048 | (2013.01) |
|---|---|
| G06F 15/163 | (2006.01) |
| G06F 3/0484 | (2013.01) |
| G11B 27/031 | (2006.01) |
| G06F 3/0488 | (2013.01) |
| G11B 27/34 | (2006.01) |
| H04N 21/4788 | (2011.01) |
| H04N 21/854 | (2011.01) |
| H04N 21/475 | (2011.01) |
| H04N 21/482 | (2011.01) |

(52) U.S. Cl.
CPC .......... *G06F 15/163* (2013.01); *G06F 3/0484* (2013.01); *G06F 3/04883* (2013.01); *G11B 27/031* (2013.01); *G11B 27/34* (2013.01); *H04N 21/4788* (2013.01); *H04N 21/854* (2013.01); *G06F 2203/04803* (2013.01); *H04N 21/4755* (2013.01); *H04N 21/482* (2013.01)

(58) Field of Classification Search
None
See application file for complete search history.

(56) References Cited

U.S. PATENT DOCUMENTS

| 6,295,058 B1 | 9/2001 | Hsu et al. |
|---|---|---|
| 6,389,181 B2 | 5/2002 | Shaffer et al. |
| 6,473,778 B1 | 10/2002 | Gibbon |
| 6,590,586 B1 | 7/2003 | Swenton-Wall et al. |
| 6,964,025 B2 | 11/2005 | Angiulo et al. |
| 7,003,583 B2 | 2/2006 | Cho et al. |
| 7,349,923 B2 | 3/2008 | Spring et al. |
| 7,362,919 B2 | 4/2008 | Das et al. |

(Continued)

*Primary Examiner* — Mahelet Shiberou
(74) *Attorney, Agent, or Firm* — James J. DeCarlo; Greenberg Traurig, LLP

(57) ABSTRACT

A Social Media Video system provides for the interactive viewing of Social Media Videos. A social media video includes one or more media assets, which may be images, video clips, music clips, text verbiages, or the like. During the display of a Social Media Video, a user may interact with the display to control the visual appearance of the audio/visual content of the display. The visual appearance of a Social Media Video may be changed to include visual and/or aural effects that are pleasing to a social media video viewer. The visual appearance of a Social Media Video may also be changed for better theatrical effect.

30 Claims, 12 Drawing Sheets

(56) References Cited

U.S. PATENT DOCUMENTS

| | | | |
|---|---|---|---|
| 7,657,835 B2 | 2/2010 | Mindrum et al. | |
| 7,680,882 B2 | 3/2010 | Tiu, Jr. et al. | |
| 7,849,083 B2 | 12/2010 | Fitzpatrick | |
| 7,979,790 B2 | 7/2011 | Truelove et al. | |
| 8,010,629 B2 | 8/2011 | Lanahan et al. | |
| 8,520,019 B1 * | 8/2013 | Freyhult et al. | 345/581 |
| 2005/0246649 A1 | 11/2005 | Wilhelm | |
| 2006/0004892 A1 | 1/2006 | Lunt et al. | |
| 2006/0182425 A1 * | 8/2006 | Boerger | G11B 27/034 386/219 |
| 2006/0253783 A1 | 11/2006 | Vronay et al. | |
| 2007/0043761 A1 | 2/2007 | Chim et al. | |
| 2007/0073776 A1 | 3/2007 | Kalalian et al. | |
| 2007/0101271 A1 | 5/2007 | Hua et al. | |
| 2007/0255785 A1 | 11/2007 | Hayashi et al. | |
| 2008/0052349 A1 | 2/2008 | Lin | |
| 2008/0052945 A1 * | 3/2008 | Matas | G06F 3/0485 34/173 |
| 2008/0092051 A1 | 4/2008 | Sidon et al. | |
| 2008/0133658 A1 | 6/2008 | Pennington | |
| 2008/0189591 A1 | 8/2008 | Lection | |
| 2008/0205694 A1 | 8/2008 | Sagoo et al. | |
| 2008/0215964 A1 | 9/2008 | Abrams et al. | |
| 2008/0215965 A1 | 9/2008 | Abrams et al. | |
| 2008/0215985 A1 | 9/2008 | Batchelder et al. | |
| 2009/0083646 A1 | 3/2009 | Lin et al. | |
| 2009/0132527 A1 | 5/2009 | Sheshagiri et al. | |
| 2009/0144392 A1 | 6/2009 | Wang et al. | |
| 2009/0184849 A1 * | 7/2009 | Nasiri et al. | 341/20 |
| 2009/0198823 A1 | 8/2009 | Bannister et al. | |
| 2009/0254643 A1 | 10/2009 | Terheggen et al. | |
| 2009/0259944 A1 | 10/2009 | Wu | |
| 2009/0327035 A1 | 12/2009 | Allard | |
| 2010/0005119 A1 | 1/2010 | Howard et al. | |
| 2010/0005139 A1 | 1/2010 | Lanahan et al. | |
| 2010/0042926 A1 | 2/2010 | Bull et al. | |
| 2010/0083141 A1 | 4/2010 | Grace | |
| 2010/0161635 A1 | 6/2010 | Dey | |
| 2010/0169784 A1 * | 7/2010 | Weber et al. | 715/731 |
| 2010/0207871 A1 * | 8/2010 | Reponen et al. | 345/156 |
| 2010/0220197 A1 | 9/2010 | Dukellis et al. | |
| 2010/0223128 A1 * | 9/2010 | Dukellis | G06Q 30/0253 705/14.51 |
| 2010/0325547 A1 | 12/2010 | Keng et al. | |
| 2011/0126148 A1 | 5/2011 | Krishnaraj et al. | 715/784 |
| 2012/0023462 A1 * | 1/2012 | Rosing et al. | 715/863 |
| 2012/0176401 A1 * | 7/2012 | Hayward et al. | 345/619 |
| 2013/0179925 A1 * | 7/2013 | Woods | H04N 21/42209 725/42 |
| 2013/0239062 A1 * | 9/2013 | Ubillos et al. | 715/838 |
| 2014/0212112 A1 * | 7/2014 | Haff | G11B 27/02 386/286 |

* cited by examiner

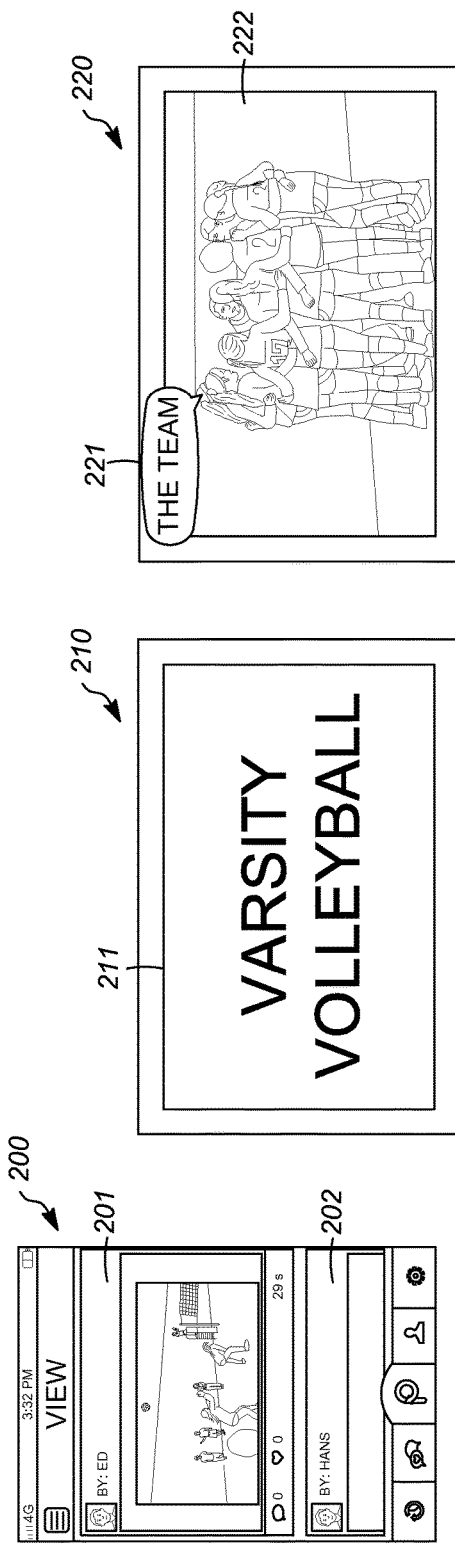
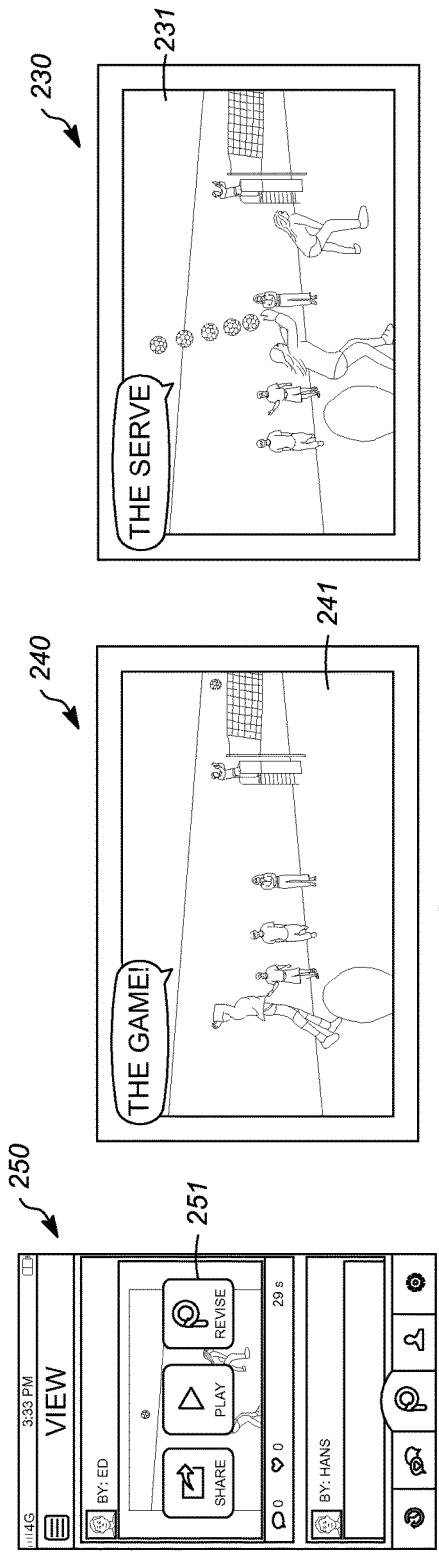

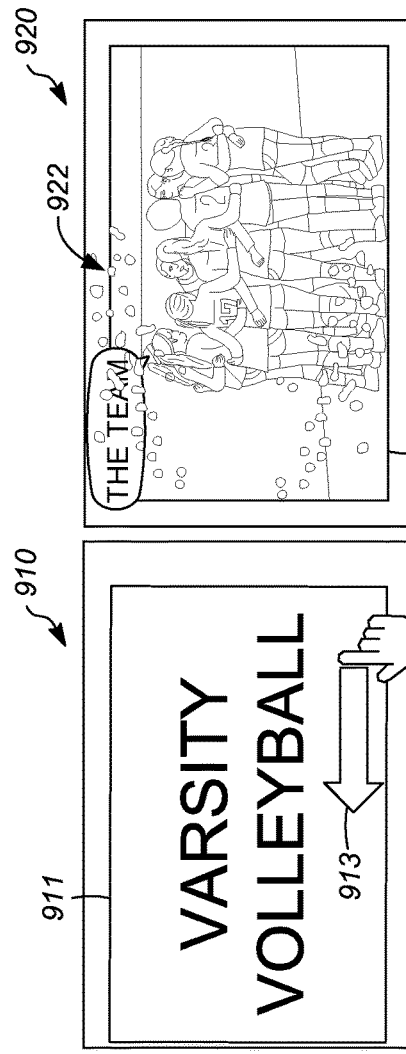
FIG. 9A
FIG. 9B
FIG. 9C
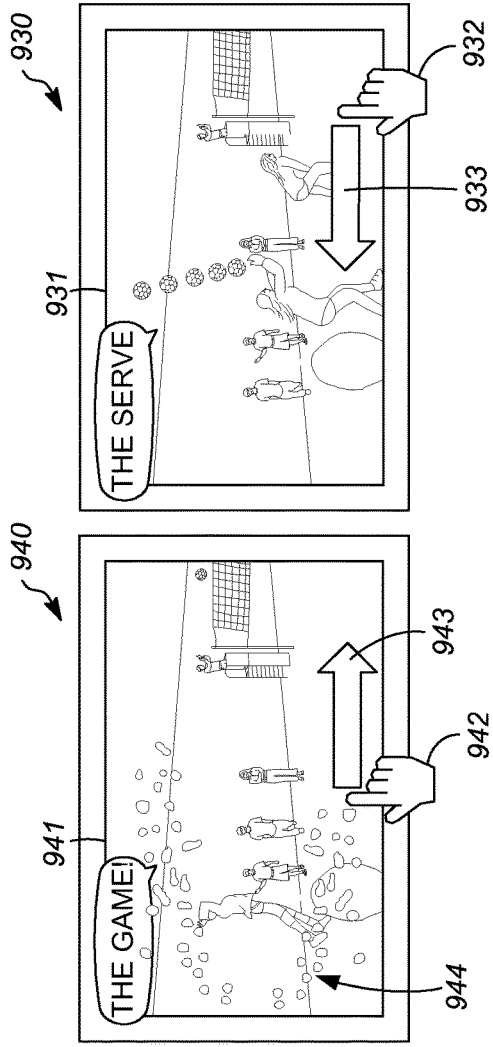
FIG. 9D
FIG. 9E
FIG. 9F

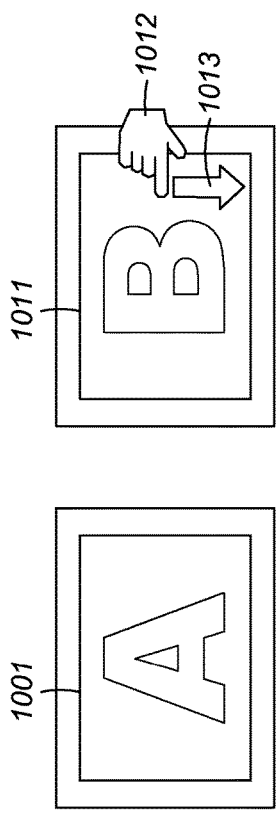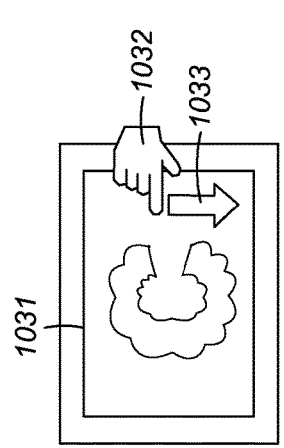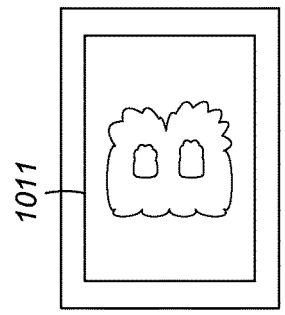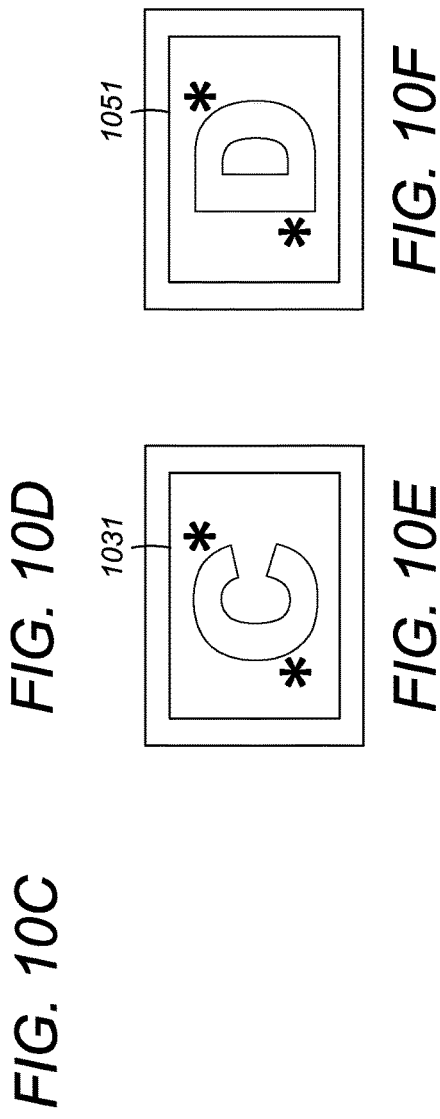
FIG. 10A  FIG. 10B  FIG. 10C  FIG. 10D  FIG. 10E  FIG. 10F

INTERACTIVE MOBILE VIDEO VIEWING EXPERIENCE

CROSS-REFERENCE TO RELATED APPLICATION

This application claims priority to U.S. Provisional Application No. 61/649,916 filed on May 21, 2012, the entire content of which is hereby incorporated by reference for all purposes.

BACKGROUND

1. Field

The present disclosure relates generally to social media videos, and more specifically, to interactive user interfaces for viewing social media videos.

2. Description of Related Art

Conventional social media technologies allow for the authoring of visual content by one content author and for the consumption of that authored content by a large number of viewers. For instance, video and image hosting websites such as YOUTUBE and FLICKR allow content to be uploaded once and viewed many times. Conventional social media technologies provide content authors with tools that promote creativity and improve the aesthetic qualities of authored content, but the same tools are not provided to viewers for interacting with and/or changing authored content in meaningful ways.

SUMMARY

In some embodiments, a social media video blog ("Social Media Video") is displayed by obtaining a plurality of media objects from a Social Media Video service provider. At least one media object of the obtained plurality of media objects is a digital image. At least two of the media objects of the obtained plurality of media objects are associated with a display order. During the display of a first media object on a display screen, an input sensor receives an input. The displayed content is changed in response to the received input. For example, if the received input is a horizontal finger swipe by a user, then a second media object is displayed in place of the first media object. If the received input is a vertical finger swipe by a user, then the visual appearance of the displayed first media object is changed. In some embodiments, the finger swipe is received by a touch-sensitive surface.

In some embodiments, a leftward horizontal finger swipe causes the next media object in the display order to be displayed, and a rightward horizontal finger swipe causes the previous media object in the display order to be displayed. In some embodiments, a downward vertical finger swipe causes the displayed media object to change colors, focus, and/or some other visual quality, and a subsequent upward vertical finger swipe causes the displayed media object to return to its unchanged form.

In some embodiments, input representing movement of the display screen is received. In some embodiments, input from a light sensor, camera, or charge-coupled device is received. The visual appearance of a portion of a displayed media object may be changed based on the received input. In some embodiments, the received inputs may also cause a sound to be played.

DESCRIPTION OF THE FIGURES

FIGS. 2A-2F depict an exemplary user interface for displaying a Social Media Video.

FIGS. 9A-9F depict an exemplary user interface for viewing a Social Media Video.

FIGS. 10A-10F depict an exemplary user interface for viewing a Social Media Video.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

The embodiments described herein include a user interface for interacting with video blogs in the social media ("Social Media Video"). Once authored, a Social Media Video may be downloaded and viewed by various users. A Social Media Video is created using media assets. Media assets may be visual or aural digital media objects, such as images, video clips, audio clips, text verbiages, or the like. Media assets may be retrieved from a location that is accessible via the internet, such as a social media website. A user may associate a Social Media Video with various style profiles that affect the aesthetic qualities of the Social Media Video. Using style profiles, users who are untrained in movie-making can produce high-quality Social Media Videos for viewing by others. During the viewing of a Social Media Video, a viewer (i.e., a user) may interact with the Social Media Video and change the visual appearance of the Social Media Video.

Figure 1:
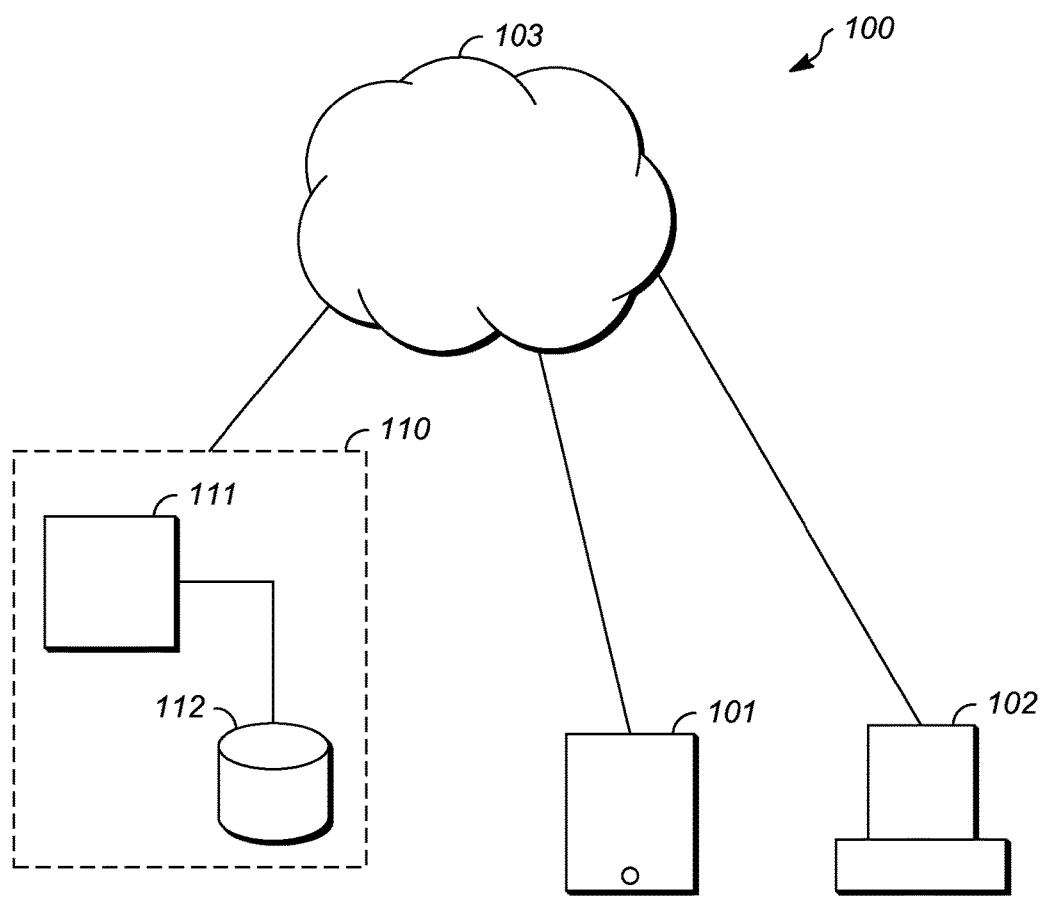
FIG. 1 depicts an exemplary Social Media Video system.

FIG. 1 illustrates an exemplary Social Media Video system 100 that supports the authoring and viewing of Social Media Videos. Exemplary Social Media Video system 100 includes Social Media Video service provider 110, which may include server 111 and database 112 for storing Social Media Videos and related data. Social Media Video service provider 110 is connected to cloud network 103. Mobile computing device 101 and desktop computing device 102 are connected to Social Media Video service provider 110 via cloud network 103. Mobile computing device 101 may be a cellular phone (e.g., a smartphone) or a tablet computer, for example. Desktop computing device 102 may be a laptop or a desktop computer, for example. One or more of Social Media Video service provider 110 (e.g., server 111), mobile computing device 101, and computer 102 may have computer-executable instructions for creating and/or viewing Social Media Videos and their related data. Cloud network 103 may include portions of the internet, a public network, a private network, or a combination thereof.

1. Viewing a Social Media Video

In some embodiments, a native application that operates on a computing device includes computer-executable instructions for creating and/or viewing Social Media Videos. For example, the native application may be an APPLE iOS "app" or a GOOGLE Android "application" or "widget".

FIGS. 2A-2F illustrate an exemplary display of a Social Media Video on a computing device that is local to a user (i.e., a "local computing device"). As shown in FIG. 2A, images that represent Social Media Videos 201-202 are displayed on screen 200. The local computing device displays Social Media Video 201 in response to a user's finger tap on the representative image. As shown in FIG. 2B, the display of exemplary Social Media Video 201 begins with text 211 indicating that the topic of video 201 is a volleyball game. After awhile, the display transitions to media asset 222, which is an image, as shown in FIG. 2C. After awhile, the display transitions to video clip 231, as shown in FIG. 2D. The display of Social Media Video 201 concludes with visually enhanced image 241, as shown in FIG. 2E. Visually enhanced image 241 may be, for example, a color image that has been converted into a black-and-white image. In contrast, media asset 222 was displayed in its native form. The display of Social Media Video 201 is accompanied by audio.

Figure 3:
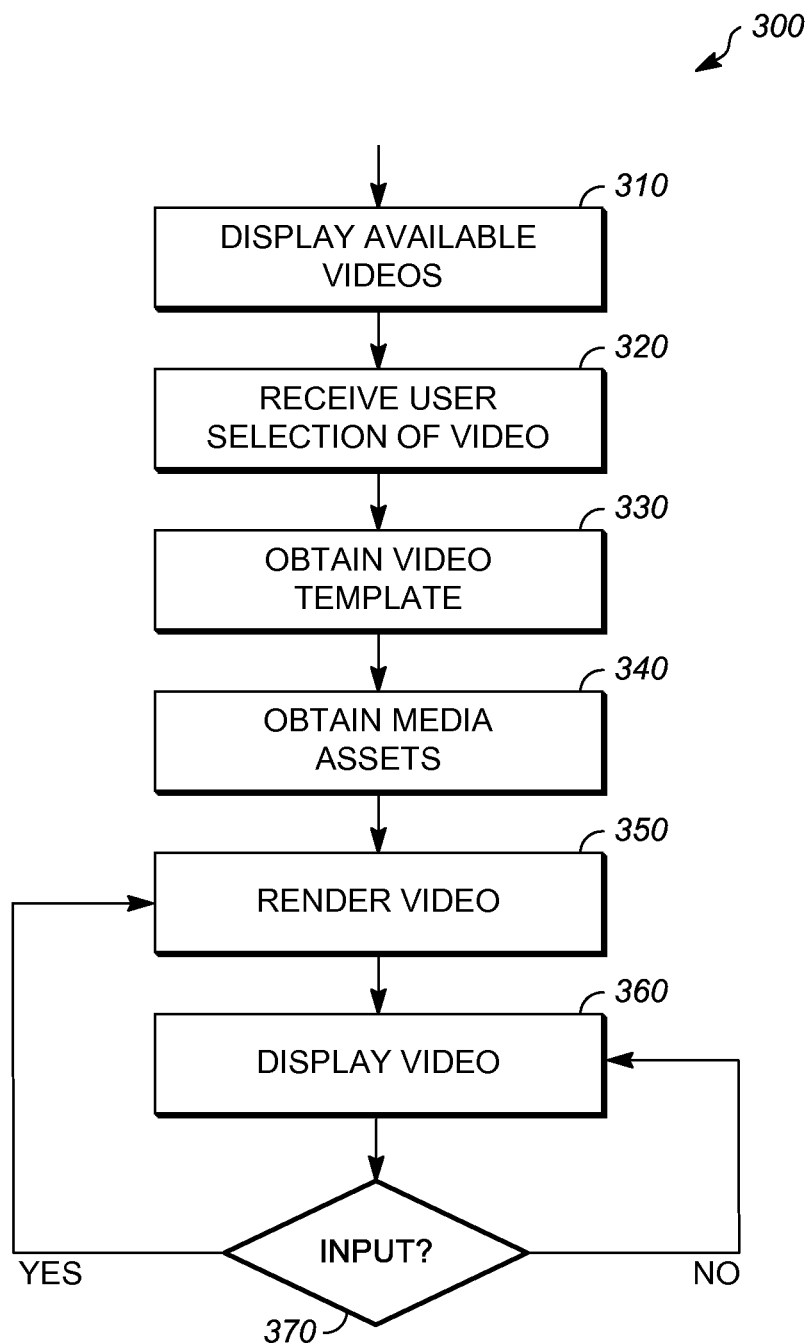
FIG. 3 depicts a block diagram of an exemplary process for the interactive viewing of Social Media Video.

FIG. 3 illustrates exemplary process 300 that is carried out by a local computing device to display a Social Media Video as described above. At block 310, images representing Social Media Videos that are available for viewing are displayed on a display screen. At block 320, a user's selection (e.g., a tap) of one of the representative images is received. The input may be a tap on an image that represents a Social Media Video. At block 330, a template that defines the selected Social Media Video is obtained by the local computing device from a Social Media Video service provider. The obtained template includes meta-data and data. The template meta-data identifies the media assets of the Social Media Video. For example, the template meta-data may reference images, video clips, and/or audio clips that are stored at the Social Media Video service provider. The template data provides information that is used to render the Social Media Video for viewing. For example, the template data may include a default order in which the media assets of the Social Media Video are to be displayed. The default order may have been defined by a user, a local computing device, and/or a combination of the two. The template data may also include text verbiages that are to be displayed together with media assets. At block 340, media assets that are referenced but are not available locally are obtained by the local computing device from the Social Media Video service provider. At block 350, a rendering process uses the template and the referenced media assets to produce a visual (and optionally, aural) presentation of the Social Media Video. At block 360, the rendered information is presented via a display screen of the local computing device (and optionally speakers).

Inputs to a local computing device can affect the display of a Social Media Video on the local computing device. At block 370, the local display device determines whether an input is received. If an input is received, processing returns to block 350, where the rendering process produces an updated visual (and optionally aural) presentation of the Social Media Video based on the received input. If no input is received, processing returns to block 360, where the display of the Social Media Video continues.

2. Creating a Social Media Video

Figure 4B:
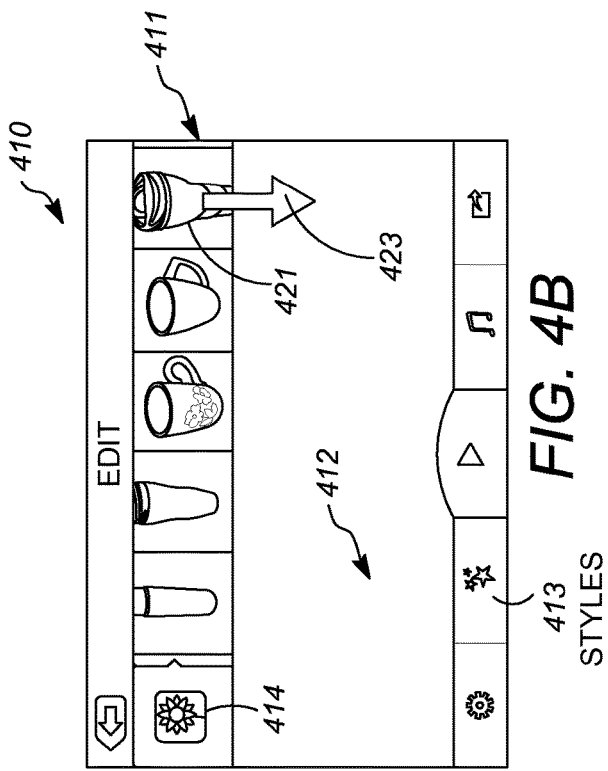
FIGS. 4A-4C depict an exemplary user interface for creating a Social Media Video.
Figure 4C:
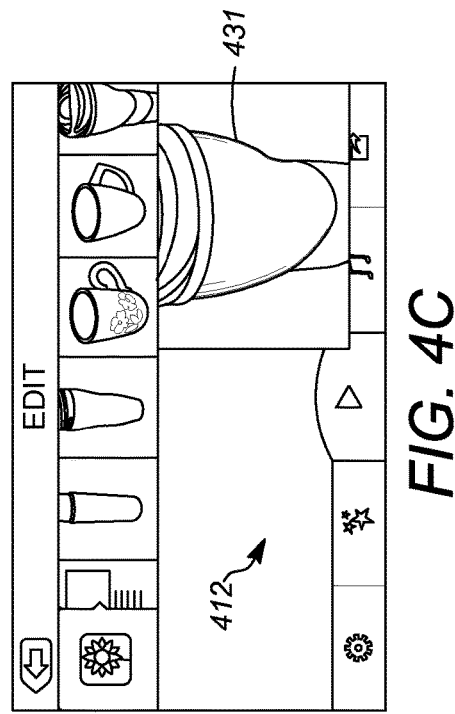
Figure 4A:
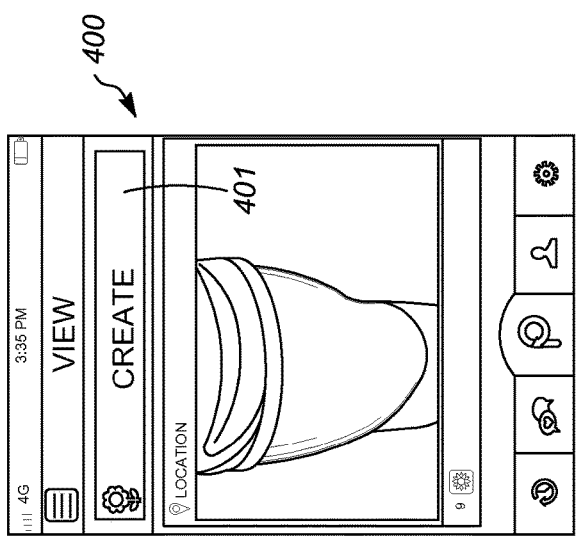

The creation of a Social Media Video is discussed below with reference to FIGS. 4A-4C. As shown in FIG. 4A, create button 401 may be selected by a user to begin the creation process. In response to the user's tap on create button 401, editing view 410 is displayed. As shown in FIG. 4B, editing view 410 includes "media carousel" 411, which displays thumbnail versions of media assets that are available for inclusion into a Social Media Video. Further, editing view 410 includes "timeline" 412, which displays the contents of the Social Media Video that is being created. Further still, editing includes button 413 for further configuring a Social Media Video.

A media asset that is represented by a thumbnail in media carousel 411 may be added to timeline 412 by swiping, with a finger, the corresponding media asset thumbnail from media carousel 411 into timeline 412. The finger swipe may be a downward finger swipe in the direction of block arrow 423 that begins from media asset thumbnail 421 (in media carousel 411) and ends at timeline 412. In this way, the media asset represented by exemplary media asset thumbnail 421 is added to timeline 412 of a Social Media Video that is being created, as shown in FIG. 4C.

Note, as used here, the concept of vertical (i.e., upward/downward) and horizontal (i.e., leftward/rightward) finger swipes need not be mathematically exact. That is, for instance, an upward vertical finger swipe need not be separated perfectly by 90 degrees from a rightward horizontal finger swipe. One of ordinary skill in the art would recognize that user input mechanisms (e.g., touch-sensitive surfaces and corresponding input logic) in the art are designed to categorize user input into up/down and left/right directions even if the user input is not level and/or straight. For example, as interpreted by a user input mechanism, a wiggly swipe along generally upward direction may constitute an upward finger swipe.

3. Style Profiles

A user may associate a Social Media Video with a style profile via button 413. The association of a style profile affects the visual and/or aural presentation of a Social Media Video. For one, the selection of a style profile may cause an audio clip and/or other sound effect to be played during the viewing of a Social Media Video. For another, the selection of a style profile may affect the visual presentation of a Social Media Video. The visual appearance of individual media assets can be affected by a style profile. For example, a style profile can change the color palette, hue, contrast, brightness, focus (e.g., blurring), boundaries (e.g., cropping, bordering), or the like, of the display of a media asset. A style profile can also change the font face and style of the display of text verbiages in a Social Media Video. The overall visual appearance of a Social Media Video can be affected by a style profile, too. For example, a style profile can change the display durations of multiple media assets, methods of transition between displayed media assets, timings of transitions, or the like. A style profile can also affect the camera movement (e.g., pan, zoom), camera perspective (i.e., viewpoint), aspect ratio, or the like, of the display of a Social Media Video. Moreover, the selection of a style profile may add visual elements to a displayed Social Media Video. For example, snowflakes and stardust can be overlaid onto certain media assets of a Social Media Video, meaning that snowflakes and/or stardust can be displayed at the same time as a media asset, and that portions of any displayed snowflakes and/or stardust can completely block (i.e., be opaque) or partially block (i.e., be translucent) portions of any displayed media assets. Text verbiages (including user commentaries) can also be added onto the media assets of a Social Media Video.

Figure 5:
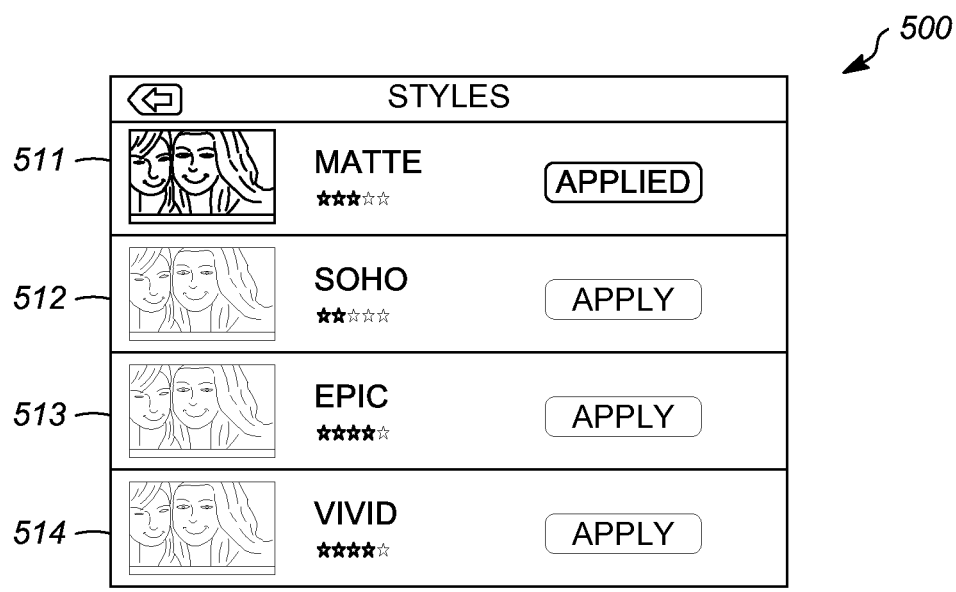
FIG. 5 depicts an exemplary user interface for creating a Social Media Video.
Figure 6A:
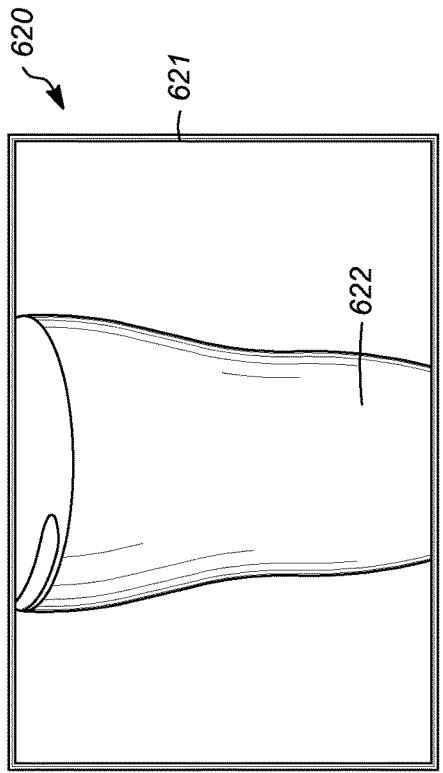
FIGS. 6A-6D depict an exemplary user interface for creating a Social Media Video.
Figure 6B:
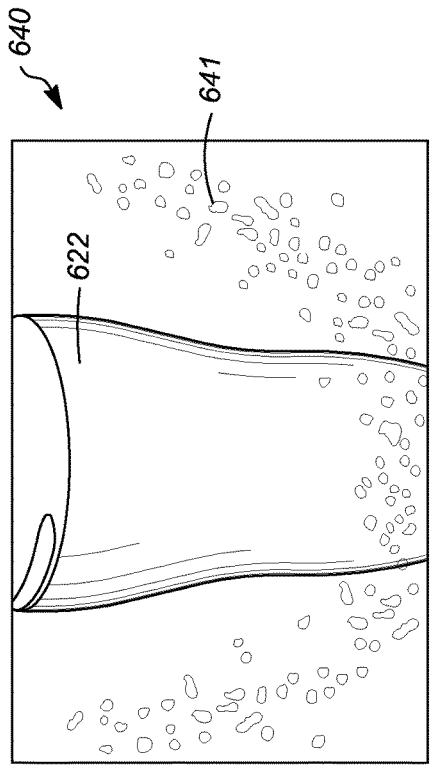
Figure 6C:
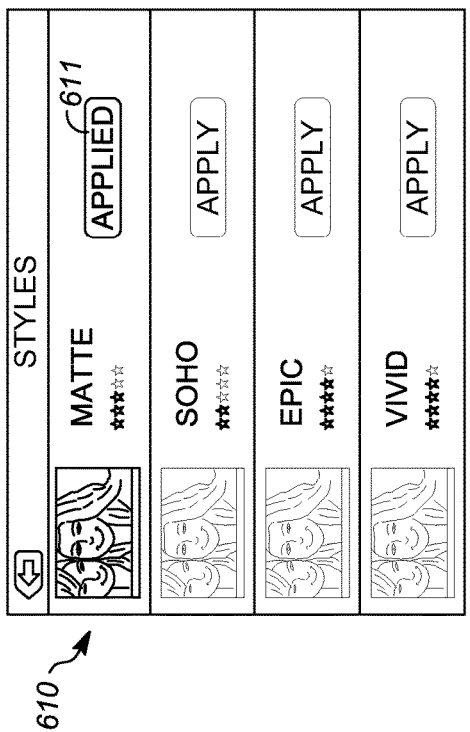
Figure 6D:
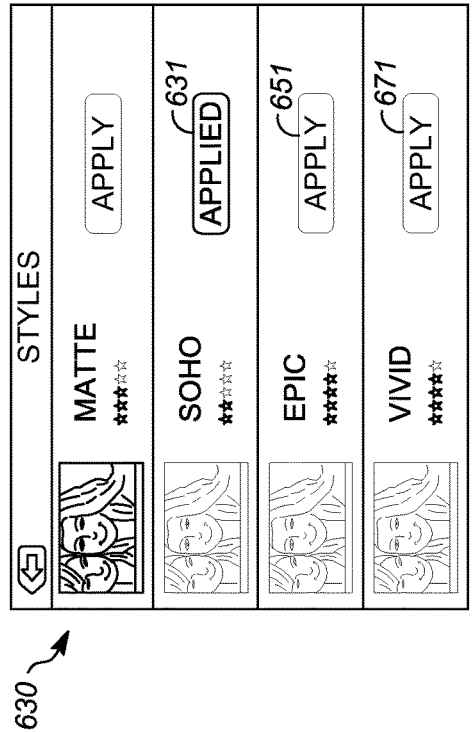

FIG. 5 shows exemplary style profiles 511-514, which are displayed in response to a user's tap on style button 413 (FIG. 4B). FIGS. 6A-6D illustrate exemplary applications of style profiles to a Social Media Video. Views 610 and 630 may be view 500 (FIG. 5) in some embodiments. As shown in FIG. 6A, exemplary "matte" style profile 611 is selected. FIG. 6B illustrates the viewing of an exemplary Social Media Video having media asset 622, which is an image of a coffee cup, using the "matte" style profile 611. The selection of "matte" style profile 611 causes border 621 to be added to the display of media asset 622. Also, media asset 622 is displayed with a matte finish. FIG. 6C illustrates the selection of exemplary "soho" style 631. As shown in FIG. 6D, the selection of "soho" 631 style profile causes the display of media asset 622 to include overlaid visual effects in the form of stardust 641. Also, media asset 622 is displayed out of focus and with a glossy finish.

Although the selection of a style profile affects the display of a Social Media Video, the changes are not made immediately at the time of style profile selection. That is to say that, for example, media asset 622 is not converted immediately upon the selection of the "matte" or "soho" style profiles as discussed above. Rather, changes to the media assets of a Social Media Video due to the selection of a style profile are rendered by a local computing device using a rendering process just-in-time before the media assets are displayed.

4. Interactive Social Media Video Viewing Experience

One advantage provided by the just-in-time rendering of Social Media Videos is that the visual appearance of a Social Media Video can be changed while the Social Media Video is being displayed. For instance, a local computing device may have sensors that complement traditional user input interfaces. The display of a Social Media Video can react to input from one or more of these sensors and user input interfaces. Examples of sensors include GPS sensors, light sensors, gyroscopes, accelerometers, or the like, functioning along with traditional input interfaces such as touch-sensitive surfaces, buttons, keyboards, mice, or the like.

An input may be a user input or a non-user input. That is, any input that can be sensed by a local computing device can be used for affecting the display of a Social Media Video, without any requirement that the inputs be intended by or be performed by a user. In this way, a Social Media Video can interact with a user and/or with the environment in which it is being displayed.

As one example, during the display of a current media asset, the local computing device may be tilted in different directions. The tilting of a local computing device can change the angle, location, and/or intensity of incident sunlight and/or ambient light that is projected onto the display screen of the local computing device. A gyroscope and/or an accelerometer of the local computing device can sense the tilting of the local computing device. A light sensor of the local computing device can detect the intensity of the incident sunlight and/or ambient light. A charge-coupled device, such as a camera, of the local computing device can also detect the positioning of high-intensity objects such as a light source. In response to these inputs, a portion of the currently displayed media asset is updated to produce a glossy appearance. In this way, the local computing device uses its sensors to electronically mimic the appearance of glare. Put another way, a local computing device can mimic the visceral, visual appearance of a glossy physical photograph, as if the physical photograph is being viewed under a light source. Notably, the recreation of a glossy photograph is possible even if the corresponding media asset has a matte (i.e., not glossy) appearance and/or if the display screen of the local computing device is anti-reflective.

Figure 7C:
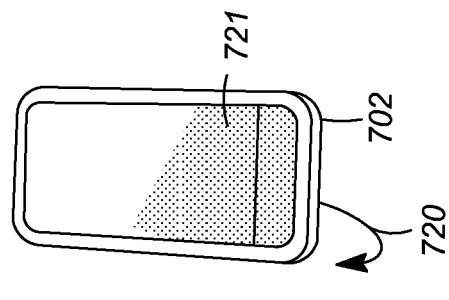
FIGS. 7A-7C depict an exemplary user interface for viewing a Social Media Video.
Figure 7B:
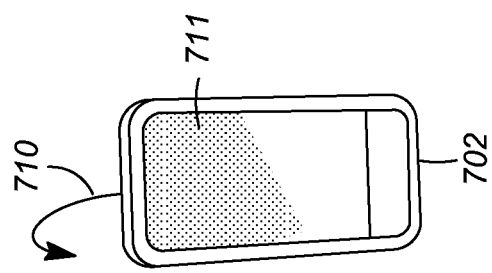
Figure 7A:
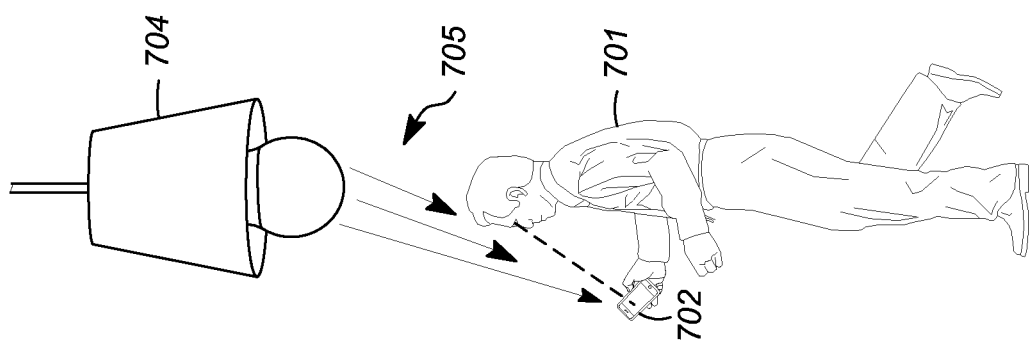

FIGS. 7A-7C illustrate an exemplary user interface for interacting with a Social Media Video in the above-described manner. As shown in FIG. 7A, local computing device 702 is placed under lamp 704 and is displaying information to user 701. Lamp 704 produces light in the direction 705 of local computing device 702. FIG. 7B illustrates the movement (e.g., tilting) of local computing device 702 in a direction 710 away from lamp 704. In response to the movement in direction 710, local computing device 702 updates portion 711 of its display screen such that content that is displayed within portion 711 is displayed with a glossy appearance. The glossy appearance of content within portion 711 mimics reflection from lamp 704, even though the display screen of local computing device 702 is anti-reflective. FIG. 7C illustrates the movement (e.g., tilting) of local computing device 702 in a direction 720 towards lamp 704. In response to the movement in direction 720, local computing device 702 updates portion 721 of its display screen such that content that is displayed within portion 721 appears glossy (and such that content within region 711 no longer appears glossy). In this way, local computing device 702 mimics the effects of light reflection on a moving display screen that otherwise would not fully produce reflections.

Figure 8:
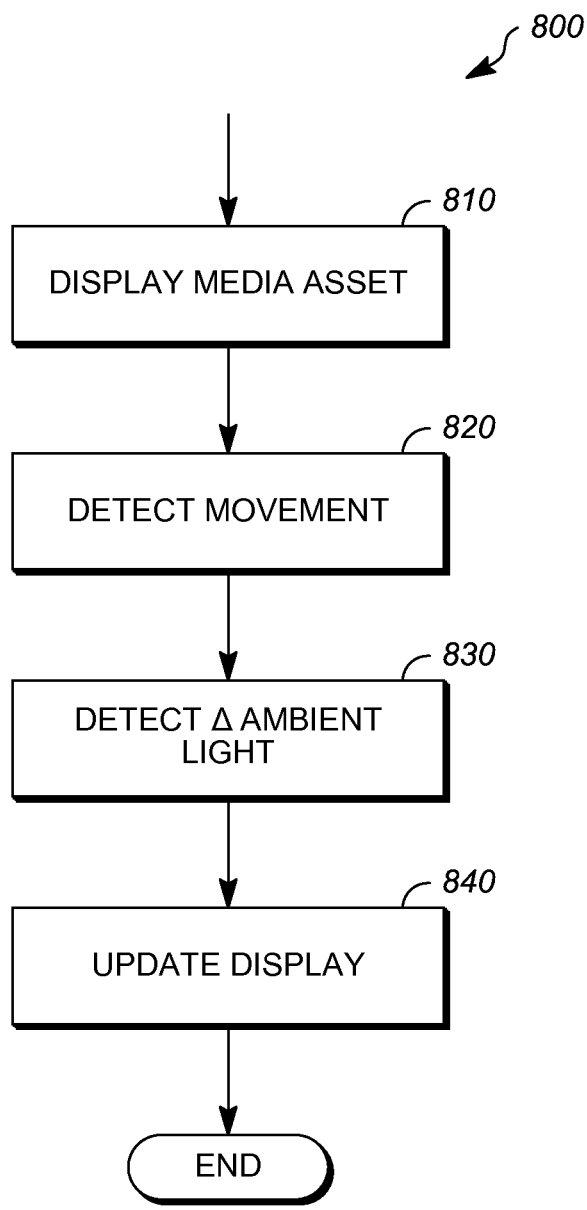
FIG. 8 depicts a block diagram of an exemplary process for the interactive viewing of a Social Media Video.

FIG. 8 illustrates exemplary process 800 that may be used to provide the above-described interactive user interface. At block 810, a media asset of a Social Media Video is displayed by a local computing device. At block 820, a movement sensor (e.g., accelerometer, gyroscope) of the local computing device detects movement. At block 830, a light sensor and/or a camera of the local computing device detects changes in ambient lighting conditions. At block 840, the displayed media asset is updated based on the movement and the change in ambient lighting conditions. For instance, if the local computing device has tilted up and the ambient lighting intensity has increased, portions of the displayed media asset may be displayed with a glossy appearance by applying an electronic filtering mechanism during the rendering of the media asset.

As another example, during the display of a media asset ("the current media asset"), a user may swipe a finger horizontally to the right via a touch-sensitive surface. In response to this rightward finger swipe, the display switches to the media asset that was displayed immediately prior to the current media asset. A user may also swipe horizontally to the left during the display of the current media asset. In response to this leftward finger swipe, the display switches immediately to the next media asset that is to be displayed according to the default order. A user may also swipe upward (or downward) vertically to advance to a next (or previous) collection of media assets. Recall, a Social Media Video constitutes a collection of media assets. In this way, a user may review the contents of a collection (e.g., media assets in a Social Media Video) by swiping left or right, and the contents of another collection (e.g., media assets in another Social Media Video) by swiping up or down. In addition, the transition from the display of a media asset to another media asset can be accompanied by visual effects, such as snowflakes and stardust overlaid on one or more of the media assets.

FIGS. 9A-9F illustrate an exemplary user interface for interacting with a Social Media Video in the above-described manner. In FIG. 9A, media asset 901 is displayed. After awhile, the view transitions from media asset 901 to media asset 911, as shown in FIG. 9B. When media asset 911 is displayed, a user 912 swipes a finger horizontally in the left direction as indicated by block arrow 913. The finger swipe may be detected, for example, by a touch-sensitive surface that is coupled to the display screen. In response to the leftward finger swipe, the view transitions to media asset 921, which is the media asset that would have been displayed next, had user 912 not swiped. The transition to media asset 921 may be accompanied by visual effects 922, as shown in FIG. 9C. After awhile, the view transitions from media asset 921 to media asset 931, as shown in FIG. 9D. When media asset 931 is displayed, a user 932 swipes horizontally in the left direction as indicated by block arrow 933. In response to the leftward finger swipe, the view transitions to media asset 941, which is the media asset that would have been displayed next, had user 932 not swiped. The transition is also accompanied by visual effects 944, as shown in FIG. 9E. When media asset 941 is displayed, a user 942 swipes horizontally in the right direction as indicated by block arrow 943. In response to the rightward finger swipe, the view transitions back to media asset 931, which is the media asset that was displayed immediately prior to the current media asset. The leftward and rightward finger swipes are complementary in that the function performed by each is the reverse of the other.

As yet another example, during the display of a current media asset, a user may swipe vertically up and/or down. In response to this swipe gesture, the displayed Social Media Video becomes rendered and displayed based on a new style profile. As discussed above, a Social Media Video may be associated with a style profile (e.g., exemplary style profiles 611, 631, 651, and 671 as shown in FIG. 6) that affects the visual and/or aural presentation of the Social Media Video. In response to an upward finger swipe, a Social Media Video that is associated with one style profile (e.g., 611) may become associated with another style profile (e.g., 671) Likewise, in response to a downward finger swipe, a Social Media Video that is associated with style profile 611 may become associated with style profile 631. The upward and downward swipes are complementary in that the function performed by each is the reverse of the other.

FIGS. 10A-10F illustrate an exemplary user interface for interacting with a Social Media Video in the above-described manner. In FIG. 10A, media asset 1001 of a Social Media Video is displayed. Media asset 1001 is displayed in its native format because the Social Media Video is associated with a style profile that does not alter the look of media asset 1001 for display. After awhile, the display transitions to media asset 1011, as shown in FIG. 10B. When media asset 1011 is displayed, a user 1012 swipes vertically in the downward direction as indicated by block arrow 1013. In response to the downward swipe gesture, a new style profile is applied to the presently displayed Social Media Video, which includes media asset 1011. As shown in FIG. 10C, the same media asset 1011 is displayed in a blurry, out-of-focus manner. After awhile, the display transitions to media asset 1031, as shown in FIG. 10D. Again, media asset 1031 has a blurry, out-of-focus appearance due to the new style profile that is applied. When media asset 1031 is displayed, a user 1032 swipes vertically in the downward direction as indicated by block arrow 1033. In response to the downward swipe gesture, a new style profile is applied to the presently displayed Social Media Video, which includes media asset 1031. As shown in FIG. 10E, the same media asset 1031 is displayed in a shiny, crisp manner. After awhile, the display transitions to media asset 1051, as shown in FIG. 10F. Again, media asset 1051 has a shiny appearance due to the new style profile that is applied the Social Media Video that is currently displayed.

Figure 11:
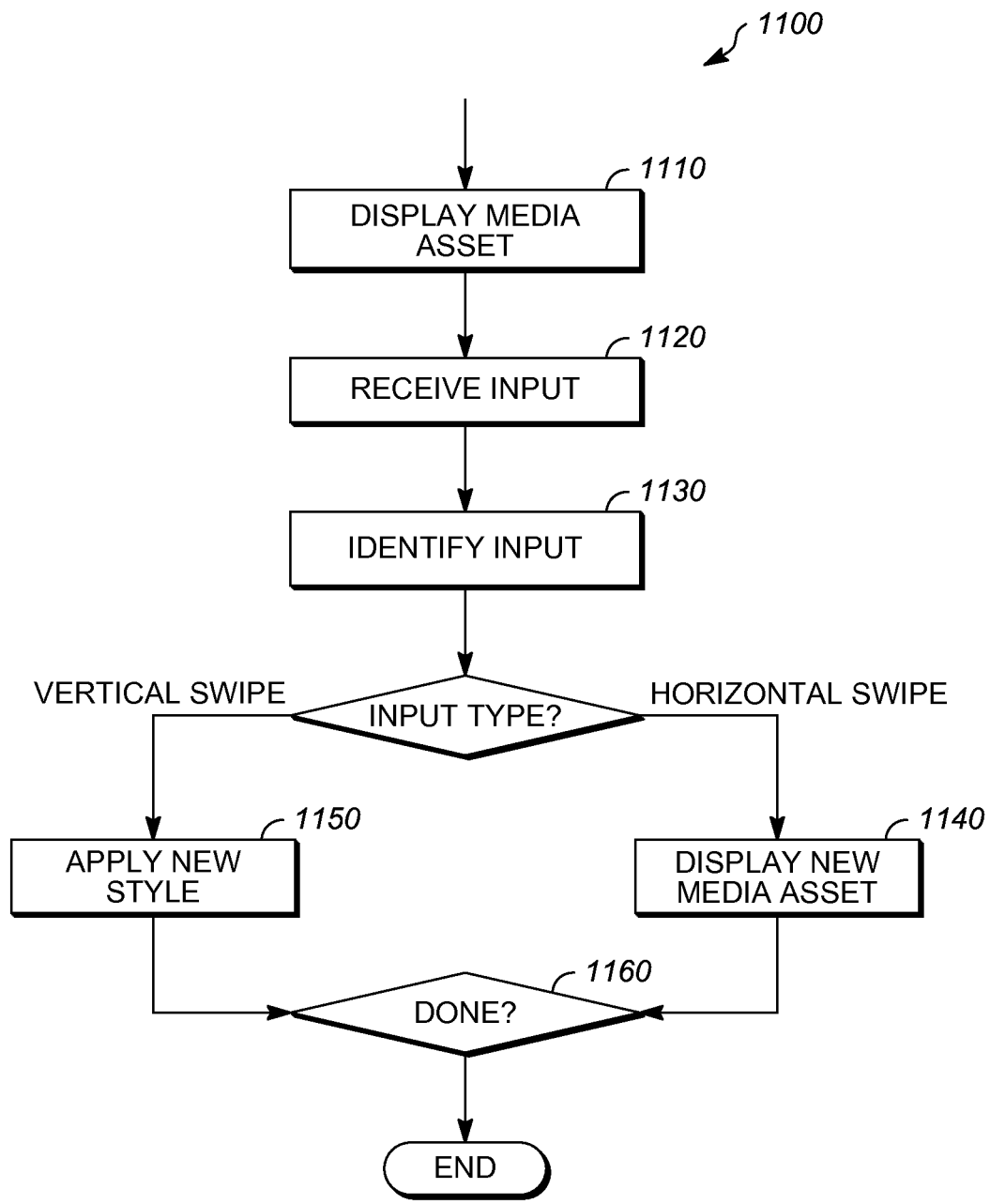
FIG. 11 depicts a block diagram of an exemplary process for the interactive viewing of a Social Media Video.

FIG. 11 illustrates exemplary process 1100 that may be used to provide the above-described interactive user interface. At block 1110, a media asset of a Social Media Video is displayed by a local computing device. At block 1120, an input is received by an input device (e.g., a touch-sensitive surface coupled to the display screen) of the local computing device. At block 1130, the input is identified as a specific gesture. The identity of the specific gesture determines downstream processing in process 1100. If the gesture is a horizontal swipe gesture, processing proceeds to block 1140. If the gesture is a vertical swipe gesture, processing proceeds to block 1150. At block 1140, a new media asset is displayed. The newly displayed media asset is selected based on the direction of the horizontal swipe gesture as discussed above. At block 1150, the currently displayed media asset is updated according to a new style profile. The new style profile is selected based on the direction of the vertical swipe gesture and style profiles that are available to the local computing device, as discussed above. After blocks 1140 and/or 1150, processing proceeds to block 1160, where the local computing device determines whether the Social Media Video includes additional media assets for display. If additional media assets are to be displayed, processing returns to block 1110. If there are no more media assets to be displayed, process 1100 ends.

As still another example, inputs to a local computing device can be used to produce audible signals that accompany the display of a Social Media Video. The addition of audio to the display of a Social Media Video helps portray emotions in a theatrical manner. For instance, in addition to switching the display of media assets, a local computing device may respond to a horizontal swipe with a swooshing sound that emphasizes swiftness in the switching of displayed media assets. A local computing device may also respond to physical movements with sound effects that elicit an emotional response from the viewer of a Social Media Video. For instance, abrupt and/or non-linear sound effects may be used to trigger a user's attention when the local computing device is jerked. In this way, interactive audible signals are incorporated into the viewing experience of a Social Media Video.

Figure 12:
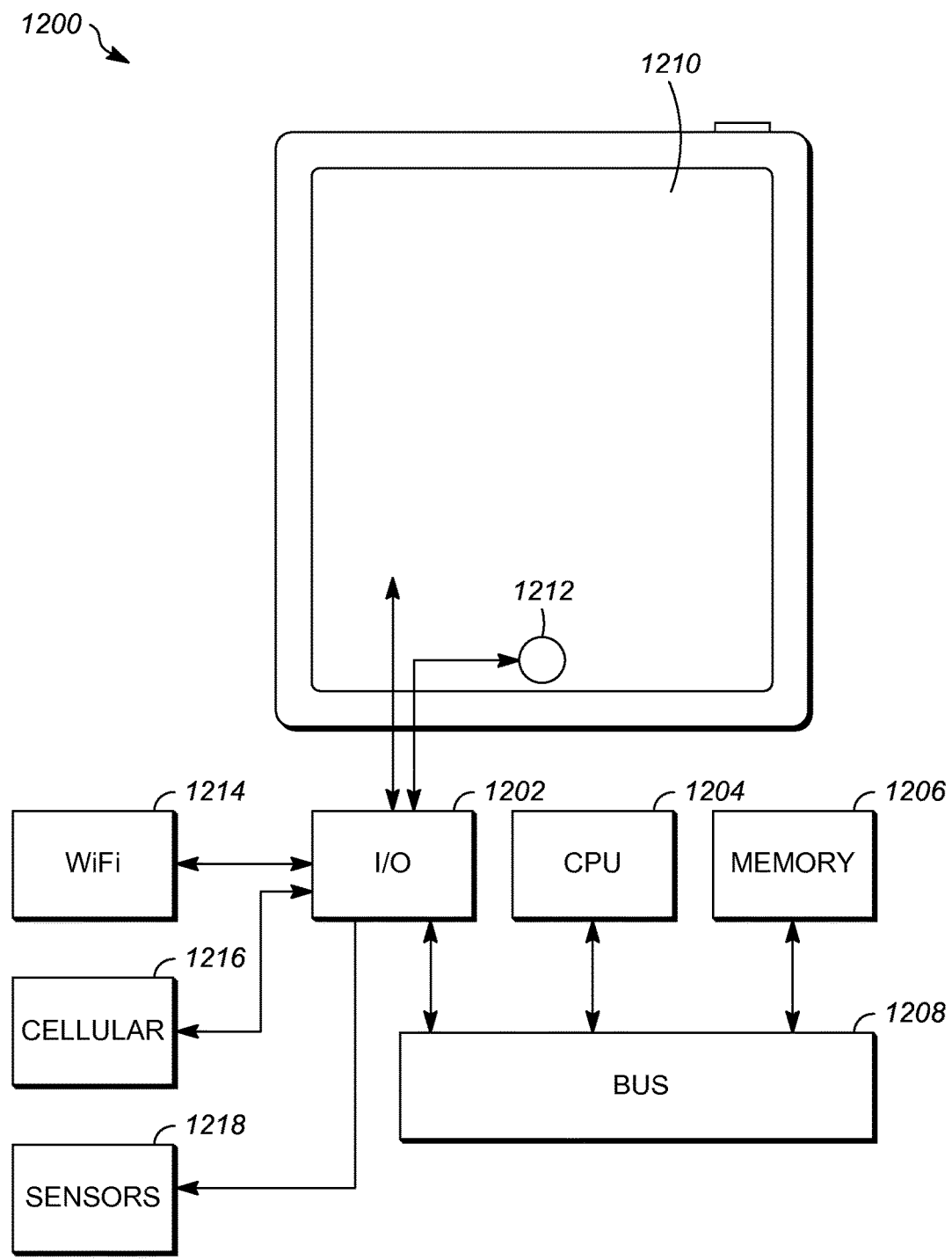
FIG. 12 depicts an exemplary computing system for performing Social Media Video processes.

Social Media Video processes 300 (FIG. 3), 800 (FIG. 8), and/or 1100 (FIG. 11) described above may be implemented in exemplary computing system 1200. As shown in FIG. 12, computing system 1200 comprises a motherboard with bus 1208 that connects I/O section 1202, one or more central processing units (CPU) 1204, and a memory section 1206 together. Memory section 1206 may contain computer executable instructions and/or data for carrying out processes 300, 800, and/or 1100. The I/O section 1202 may be connected to display 1210, input device 1212, which may be a touch-sensitive surface, one or more buttons, a keyboard, a mouse, or the like. I/O section 1202 may also be connected to Wi-Fi unit 1214, cellular antenna 1216, and/or sensors

1218. Sensors 1218 may include a GPS sensor, a light sensor, a gyroscope, an accelerometer, or a combination thereof.

In some embodiments, computing system 1200 is arranged as a cellular phone and/or a tablet computer. In some embodiments, computing system 1200 is arranged as a desktop computer and/or a laptop computer. In some embodiments, display 1210 and input device 1212 are coupled to form a touch-sensitive display screen ("touchscreen.")

At least some values based on the results of the above-described processes can be saved into memory, such as memory 1206, for subsequent use. Memory 1206 may be a computer-readable medium that stores (e.g., tangibly embodies) one or more computer programs for performing any one of the above-described processes by means of a computer. The computer program may be written, for example, in a general-purpose programming language (e.g., C including Objective C, Java, JavaScript including JSON, and/or HTML) or some specialized, application-specific language.

Although only certain exemplary embodiments have been described in detail above, those skilled in the art will readily appreciate that many modifications are possible in the exemplary embodiments without materially departing from the novel teachings and advantages of this disclosure. For example, aspects of embodiments disclosed above can be combined in other combinations to form additional embodiments. Accordingly, all such modifications are intended to be included within the scope of this technology.

What is claimed is:

1. A computer-implemented method comprising:
   identifying, via a computing device, a plurality of media objects associated with a social media video, said plurality of media objects comprising digital images associated with the social media video, said media objects further comprising data for retrieving the digital images and metadata associated with a display order of the media objects;
   causing to be displayed, on a display screen of the computing device, a first media object of the plurality of media objects;
   receiving, by an input sensor associated with the computing device, an input;
   analyzing, via the computing device, said input, and based on said analysis, determining a type of input; and
   changing, via the computing device, displayed content associated with the first media object in response to the received input and based on the type of the received input, said changing comprising:
      causing to be displayed, on the display screen of the computing device, a second media object of the plurality of media objects when the type of said received input is a horizontal finger swipe, and
      changing a visual appearance of the displayed first media object when the type of the received input is a vertical finger swipe.

2. The method according to claim 1, wherein the first media object is displayed with an initial visual appearance, and wherein the changing of the displayed content further comprises:
   changing a color or focus of the first media object vertical when the received input represents a vertical finger swipe in a downward direction.

3. The method according to claim 2, wherein the received input is a first input; and further comprising:
   receiving a second input after the first input from the input device, wherein the second input is in a upward direction; and
   changing the display of the first media object back to the initial visual appearance in response to the second input.

4. The method according to claim 1, wherein the changing of displayed content further comprises:
   changing a sound played while the first media object is displayed.

5. The method according to claim 1, wherein the second media object is the media object immediately after the first media object in the display order when the horizontal finger swipe is in a leftward direction.

6. The method according to claim 1, wherein the second media object is the media object immediately before the first media object in the display order when the horizontal finger swipe is in a rightward direction.

7. The method according to claim 1, wherein the received input represents movement of the display screen; and further comprising:
   changing the visual appearance of a portion of the displayed first media object based on the received input.

8. The method according to claim 7, further comprising:
   playing a sound based on the received input.

9. The method according to claim 7, wherein the input is a first input; and further comprising:
   receiving a second input after the first input from the input device, wherein the second input represents movement of the display screen; and
   changing the visual appearance of another portion of the first media object based on the second input.

10. The method according to claim 9, wherein the input device further comprises a charge-coupled device.

11. A mobile computing device comprising:
    (a) a touch-sensitive surface adapted to receive an input from a user;
    (b) a display screen; and
    (c) a processor operatively coupled with the touch-sensitive surface and with the display screen, the processor adapted to:
       identify a plurality of media objects associated with a social media video, said plurality of media objects comprising a digital images associated with the social media video, said media objects further comprising data for retrieving the digital images and metadata associated with a display order of the media objects;
       cause a display, on the display screen, of a first media object of the plurality of media object;
       receive, at the touch-sensitive surface, an input;
       analyze said input, and based on said analysis, determine a type of input;
       change displayed content associated with the first media object, of the display screen, in response to the received input and based on the determined type of said received input, said changing comprising:
          causing the display screen to display a second media object of the plurality of media objects when the type of said received input is a horizontal finger swipe, and
          changing a visual appearance of the displayed first media object when the type of the received input is a vertical finger swipe.

12. The mobile computing device according to claim 11, wherein the first media object is displayed with an initial visual appearance, and wherein the processor is further adapted to:

change the color or focus of the first media object when the vertical finger swipe is in a downward direction.

13. The mobile computing device according to claim 12, wherein the received input is a first input, wherein the touch-sensitive surface is further adapted to receive a second input after the first input, wherein the second input represents a finger swipe in an upward direction, and wherein the processor is further adapted to change the display of the first media object back to the initial visual appearance in response to the second input.

14. The mobile computing device according to claim 11, wherein:

the processor is further adapted to change a sound played while the first media object is displayed in response to the received input.

15. The mobile computing device according to claim 11, wherein:

the second media object is the media object immediately after the first media object in the display order when the horizontal finger swipe is in a leftward direction.

16. The mobile computing device according to claim 11, wherein:

the second media object is the media object immediately before the first media object in the display order when the horizontal finger swipe is in a rightward direction.

17. The mobile computing device according to claim 11, further comprising:

(d) a sensor operatively coupled to the processor, wherein the sensor comprises a movement sensor adapted to sense a movement of the display screen; and wherein the processor is further adapted to:

change the visual appearance of a portion of the first media object based on the sensed movement, and cause the display screen to display the first media object including the updated portion.

18. The mobile computing device according to claim 17, wherein:

the processor is further adapted to play a sound in response to the sensed movement.

19. The mobile computing device according to claim 17, wherein the sensor is further adapted to sense another movement, and wherein the processor is further adapted to:

change the visual appearance of another portion of the first media object based on the other sensed movement; and cause the display screen to display the first media object including the other updated portion.

20. The mobile computing device according to claim 19, wherein:

the input device further comprises a charge-coupled device.

21. A non-transitory computer-readable storage medium having computer-executable instructions tangibly stored thereon, the computer-executable instructions comprising instructions for:

identifying a plurality of media objects, said plurality of media objects comprising digital images associated with the social media video, said media objects further comprising data for retrieving the digital images and metadata associated with a display order of the media objects;

causing to be displayed, on a display screen of a computing device, a first media object of the plurality of media objects;

receiving, by an input sensor associated with the computing device, an input;

analyzing, via the computing device, said input, and based on said analysis, determining a type of input; and changing displayed content associated with the first media object in response to the received input and based on the type of the received input, said changing comprising:

causing to be displayed, on the display screen, a second media object of the plurality of media objects when the type of the received input is a horizontal finger swipe, and changing a visual appearance of the displayed first media object when the type of the received input is a vertical finger swipe.

22. The non-transitory computer-readable storage medium according to claim 21, wherein the first media object is displayed with an initial visual appearance, and wherein the changing of the displayed content further comprises:

changing a color or focus of the first media object vertical when the received input represents a vertical finger swipe in a downward direction.

23. The non-transitory computer-readable storage medium according to claim 22, wherein the received input is a first input; and the computer-executable instructions further comprising instructions for:

receiving a second input after the first input from the input device, wherein the second input is in a upward direction; and changing the display of the first media object back to the initial visual appearance in response to the second input.

24. The non-transitory computer-readable storage medium according to claim 21, wherein:

the change further comprises changing a sound played while the first media object is displayed.

25. The non-transitory computer-readable storage medium according to claim 21, wherein: the second media object is the media object immediately after the first media object in the display order when the horizontal finger swipe is in a leftward direction.

26. The non-transitory computer-readable storage medium according to claim 21, wherein: the second media object is the media object immediately before the first media object in the display order when the horizontal finger swipe is in a rightward direction.

27. The non-transitory computer-readable storage medium according to claim 21, wherein the received input represents movement of the display screen; and the computer-executable instructions further comprising instructions for:

changing the visual appearance of a portion of the first media object based on the received input; and causing the display of the first media object including the updated portion.

28. The non-transitory computer-readable storage medium according to claim 27, the computer-executable instructions further comprising instructions for:

causing a sound based on the sensed movement.

29. The non-transitory computer-readable storage medium according to claim 28, the computer-executable instructions further comprising instructions for:

receiving another input from the input device;
changing the visual appearance of another portion of the first media object; and
causing the display of the first media object including the other updated portion.

30. The non-transitory computer-readable storage medium according to claim 29, wherein:
the input device further comprises a charge-coupled device.

\* \* \* \* \*